March 19, 1957 D. W. WISEMAN ET AL 2,785,625
TWINELESS HAY BALING DEVICE
Filed March 9, 1956 3 Sheets-Sheet 1

INVENTORS
DONALD W. WISEMAN
HARRY DALE STAIMBROOK
BY
Merchant & Merchant
ATTORNEYS

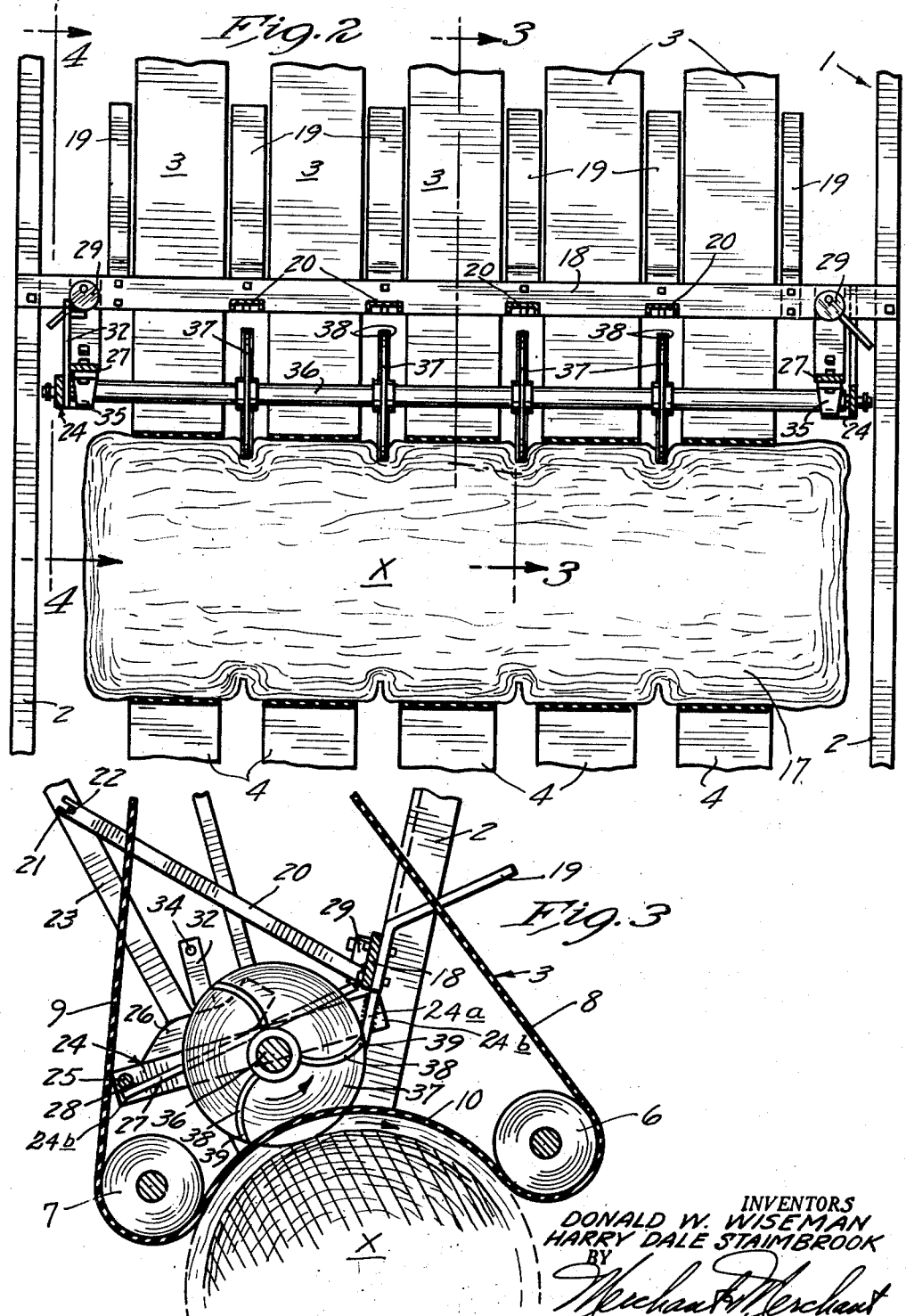

March 19, 1957   D. W. WISEMAN ET AL   2,785,625
TWINELESS HAY BALING DEVICE
Filed March 9, 1956   3 Sheets-Sheet 3

INVENTORS
DONALD W. WISEMAN
HARRY DALE STAIMBROOK
BY
Merchant & Merchant
ATTORNEYS

2,785,625

TWINELESS HAY BALING DEVICE

Donald W. Wiseman and Harry Dale Staimbrook, Pine River, Minn.

Application March 9, 1956, Serial No. 570,533

5 Claims. (Cl. 100—88)

Our invention relates generally to hay balers and more particularly to rotary hay balers, that is, hay balers which form generally cylindrical bales, as distinguished from cross-sectionally square bales.

Still more specifically, our invention provides novel means for securing together baled fibers in the baling chamber of a rotary hay baler without the use of baling twine, baling wire or the like.

The primary object of our invention is the provision of a device in the class above described including a plurality of rotary intucking rotors which are mounted for swinging movements between operative positions wherein their peripheral portions extend radially into the baling chamber when the baling chamber approaches its maximum diameter, to inoperative positions in radially outwardly spaced relation to said baling chamber, together with means for releasably locking said intucking rotors in their operative positions.

A still further object of our invention is the provision of a device in the class above described which comprises novel intucking rotors which are provided with a plurality of circumferentially spaced supplementary intucking elements which project axially outwardly from opposite sides of said rotors adjacent the periphery thereof.

A still further object of our invention is the provision of a device in the class immediately above described wherein the intucking elements are in the nature of generally radially extended elongated ribs, said ribs preferably curving generally radially outwardly and forwardly in the direction of rotation of said rotors whereby to cause a minimum of shredding action with the fibers of the bale within the chamber.

A still further object of our invention is the provision of a device of the class described which includes novel mounting means for said rotors.

A still further object of our invention is the provision of a device in the class described which provides novel spacing means for one of the groups of the opposed cooperating groups of endless belts conventionally defining the rotary baling chamber in devices of the class above described.

A still further object of our invention is the provision of a novel structure of the class above described which may be alternatively built into a rotary baler at the factory or conveniently attached thereto by the implement dealer, farmer or the like.

A still further object of our invention is the provision of a device which is simple and durable in construction, has a minimum of working parts, is relatively inexpensive to produce and is highly efficient in its operation.

The above and still further object of our invention will become apparent from the following detailed specification, appended claims and attached drawings.

Referring to the drawings, wherein like characters indicate like parts throughout the several views:

Fig. 2 is an enlarged fragmentary view, partly in elevation and partly in section, taken from the line 2—2 of Fig. 1.

Fig. 3 is an enlarged fragmentary section taken substantially on the line 3—3 of Fig. 2.

Figure 1:
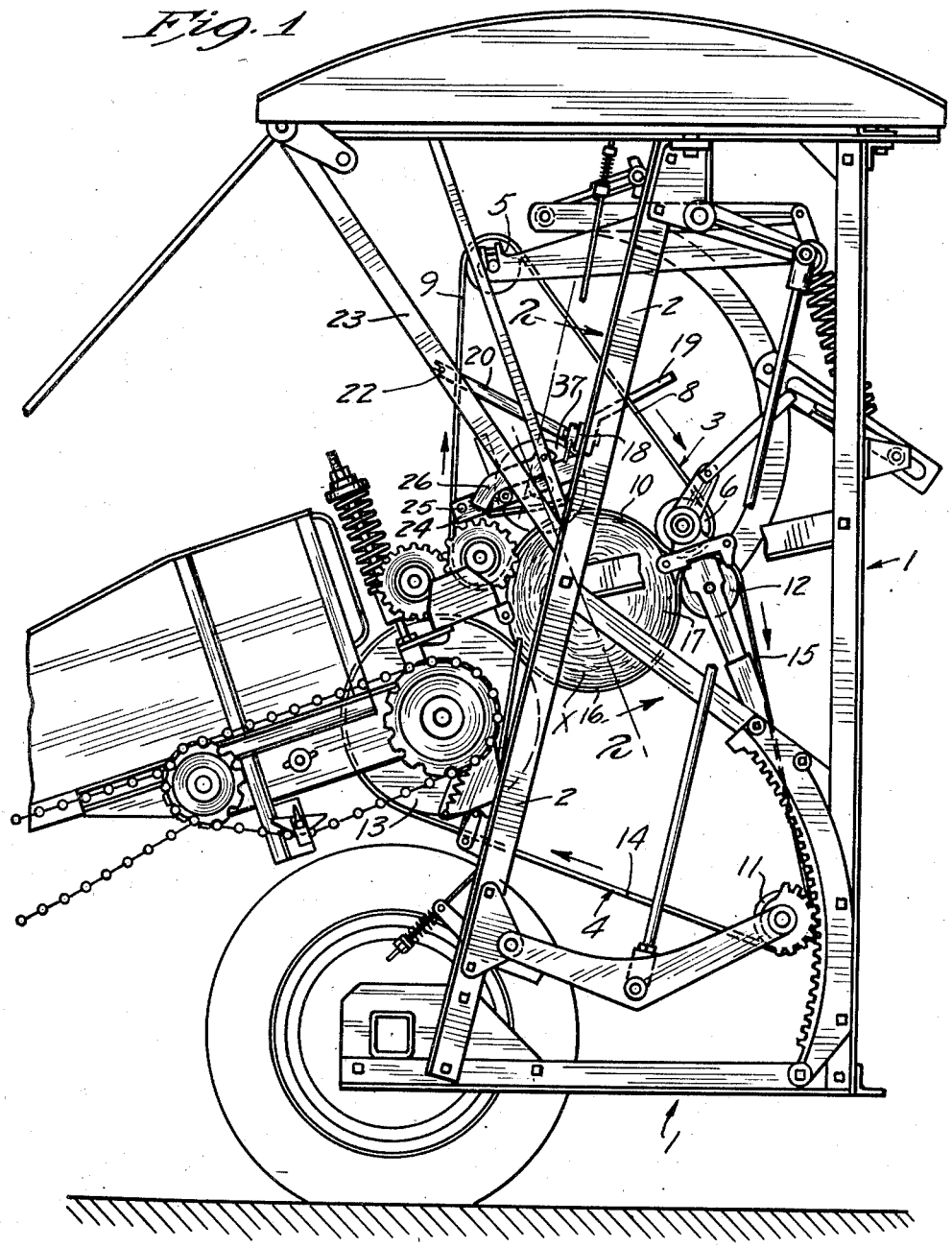
Fig. 1 is a view in side elevation of a conventional rotary hay baler with our novel structure attached thereto.

Referring with greater particularity to the drawings, the numeral 1 indicates in its entirety a mobile frame which, for the purpose of the instant invention, includes a pair of generally upright laterally spaced legs 2. Conventionally, such rotary hay balers include an upper group of cooperating endless baling belts 3 and a cooperating lower group of such endless belts 4. The belts of group 3 are adapted to run freely over rollers 5, 6 and 7, suitably mounted and journalled in the frame 1, whereby to divide same into converging delivery and return flights identified by numerals 8 and 9 respectively, and a chamber defining flight 10. The belts 4 on the other hand, run freely over rollers 11, 12 and 13, whereby to define converging delivery and return flights 14 and 15 respectively, and bale forming flight 16. Rollers 11, 12 and 13 are also suitably journalled in the frame 1. The power mechanism for imparting rotary movements to the rollers 7 and 13, whereby to cause movement of the groups of belts 3 and 4 do not form a part of the instant invention, and hence will not be described in detail. It suffices to state that such power may be derived from the power takeoff of a conventional farm tractor, not shown, but which normally would pull the wheel equipped frame 1, through any suitable power transmission mechanism, such as cooperating chains, gears and drive shafts.

It will be seen particularly by reference to Figs. 1 and 2, that the flights 10 and 16 of the belt groups 3 and 4 define a generally cylindrical baling chamber 17 for the baling of fibrous material such as hay, straw or the like, identified by the letter X. Conventionally, the baling chamber 17 increases in diameter to a predetermined maximum diameter as the bale X is being formed by fibrous material fed there into. The drawings indicate the baling chamber 17 after it has reached its maximum diameter. It will be noted that the belts making up the group of belts 3 are axially spaced with relation to the baling chamber 17.

Figure 4:
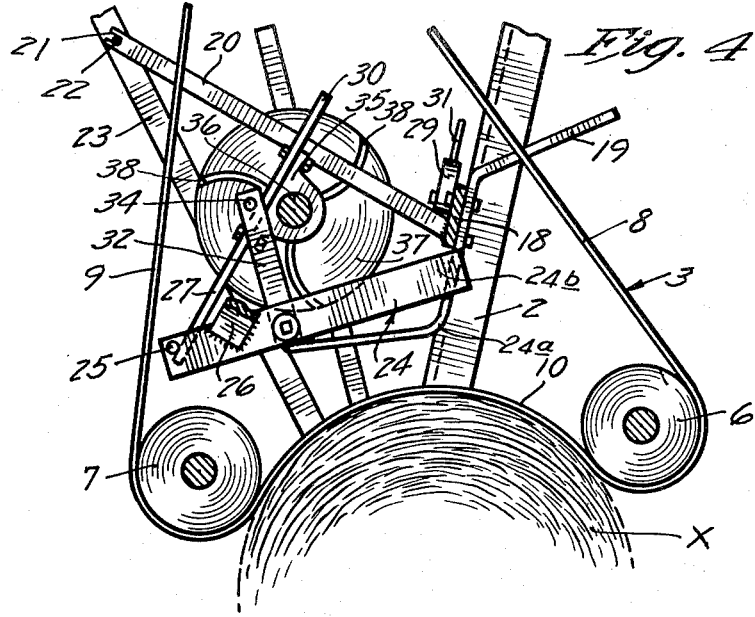
Fig. 4 is an enlarged fragmentary view, partly in side elevation and partly in section taken substantially on the line 4—4 of Fig. 2 and showing a different position of some of the parts.
Figure 5:
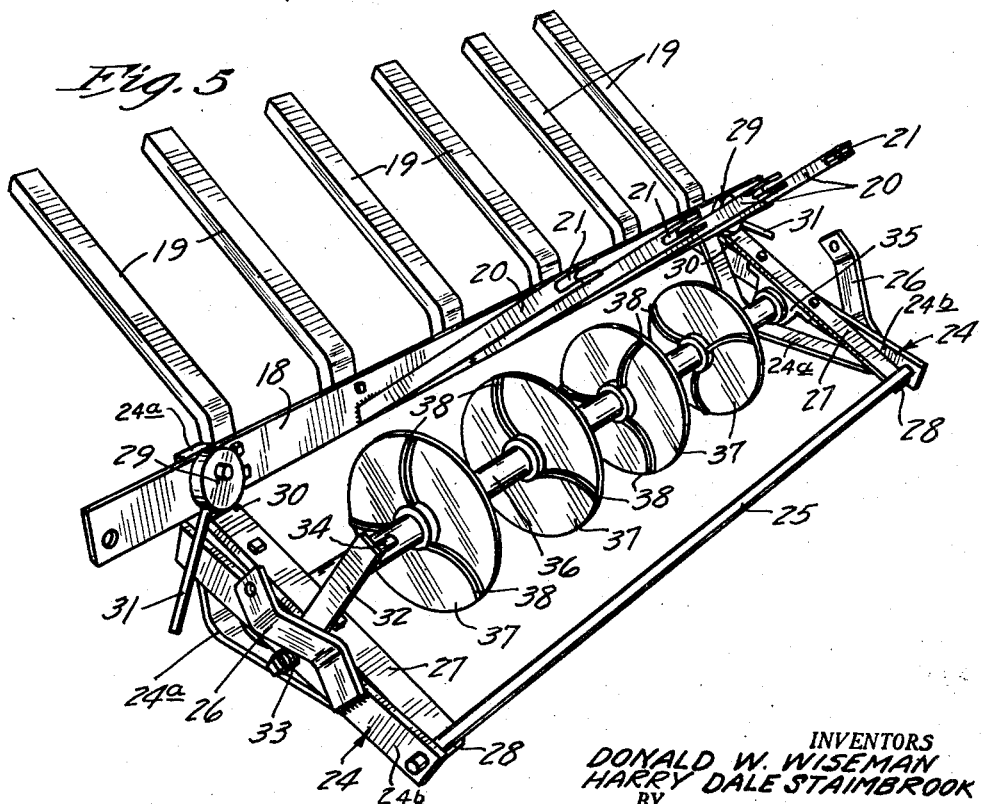
Fig. 5 is a view in perspective of our novel attachment removed from the machine and seen from the opposite end to that illustrated in Fig. 3.

Our novel attachment for the baling machine above described is shown in Fig. 5, and comprises a mounting bar 18 adapted to be rigidly secured at its opposite ends one each to one of the legs 2 of the frame 1 in radially outwardly spaced generally parallel relationship to the axis of the baling chamber 17, see Fig. 2. Rigidly carried by and laterally projecting from the mounting bar 18 in longitudinally spaced relationship are guide bars 19 between adjacent ones of which one each of the belts of the group 3 of belts is adapted to pass and be maintained in spaced relationship from the others thereof during the delivery flight 8. Rigidly carried by and projecting from the mounting bar 18 are a plurality of guide bars 20 which as shown by Figs. 3 and 4 extend between the spaced belts of group 3 on their return flight 9. Guide bars 20 not only maintain the belts 3 in spaced relationship during said flights 9, but also are provided at their upper ends with aligned notches 21 which receive therein a tie rod 22 extending between a pair of spaced frame arms 23.

A pair of attachment frame members 24, each comprising connected elements 24ᵃ and 24ᵇ, are secured at one end to and project transversely from opposite end portions of the mounting bar 18 in spaced parallel relationship and are joined at their free ends by a shaft 25 journalled therein on an axis generally parallel to the axis of the mounting bar 18 and baling chamber 17. A pair of brace members 26 are rigidly secured at one end, one each to a different one of the end frame members 24 and are adapted to be bolted or otherwise rigidly secured to opposite sides of the machine frame structure, as shown in Fig. 1.

A pair of bracket elements 27 are welded or otherwise rigidly secured at one of their ends to opposite end portions to the shaft 25, as indicated at 28, for swinging movements about the axis of the shaft 25 toward and away from the mounting bar 18. A pair of rotary locking cams or eccentrics 29 are pivotally secured to opposite end portions of the mounting bar 18 for movements into and out of the paths of travel of the free ends 30 of the bracket elements 27 to releasably lock the bracket elements 27 in their operative positions of Figs. 3 and 5. The locking cams 29 are provided with operating handles 31 whereby the cams 29 may be moved in a direction to release the bracket elements 27 for swinging movements toward their inoperative positions, as indicated in Fig. 4. A holding bar 32 is pivotally mounted at its lower end to one of the end frame members 24, and is yieldingly biased toward the adjacent bracket element 27 by a coil compression spring 33. A stop pin 34 extends inwardly from the upper end of the arm 32 and is utilized to support the bracket elements 27 and parts carried thereby in an inoperative elevated position. The upper end of the bar 32 is manually moved outwardly against bias of the spring 33 to permit movement of the adjacent bracket element 27 upwardly beyond the stop pin 34, after which the bar 32 is released to permit the stop pin 34 to be disposed below the adjacent bracket element 32 to support the same and parts carried thereby in their elevated inoperative position. Obviously, all that is necessary to return the bracket elements 27 and parts carried thereby to their operative positions of Figs. 3 and 5, is to pull outwardly upon the bar 32 against the coil spring 33 to the point where the bracket element 27 clears the stop pin 34.

Shown as being rigidly secured to the intermediate portion of the bracket elements 27, are a pair of aligned bearings 35 which journal opposite ends of a shaft 36 in radially spaced parallel relation to the baling chamber 17. Preferably, rigidly mounted on the shaft 36 in longitudinally spaced relationship thereon are a plurality of disklike intucking rotors 37. Intucking rotors 37, as shown, are generally aligned one each with the aligned pairs of guide bars 19, 20 and are adapted to be received between adjacent belts of the upper group 3 of belts in the chamber forming flight 10 when the bracket elements are moved to their operative positions of Figs. 3 and 5. It will be noted that a peripheral portion of each of such intucking rotors 37 extends radially into the baling chamber 17, between adjacent belts of the group 3 when said baling chamber 17 approaches its maximum diameter and when said rotors are in their operative positions of Figs. 3 and 5.

Specifically, it will be noted that the baling rotors 37 are formed to provide axially outwardly projecting supplementary intucking ribs or fingers 38 which extend in a curve generally radially outwardly and forwardly with respect to the direction of the rotary movements thereof, in circumferentially spaced relationship and on opposite sides of the rotors. It will be noted that the ribs 38 terminate adjacent the peripheral portions of the rotors 37, as indicated at 39. The peripheral portions 39 perform the supplementary intucking operation and the specific design of said fingers, it has been found, facilitate insertion and removal from the fibrous material and prevent shredding in said operation. The radially inner portions of the ribs 38 serve to aid rigidity to the disklike rotors 37.

As the outer peripheral edge of each rotor engages the bale forming material as in the chamber 17, rotation is imparted to the rotors by the material so that the peripheral speed of the rotors is substantially equal to that of the bale X. The like peripheral speed of the bale and the rotors together with the forward curvature of the outer end portions 39 of the ribs or fingers 38 causes the fibers of the bale X to be intertwined without shredding of the fibers, so that when the bale is released from the machine, the same will retain its generally cylindrical form without the use of twine or tying material.

While we have disclosed and described a preferred embodiment of our invention, it should be obvious that same is capable of modification without departure from the scope and spirit of the invention as is defined in the appended claims.

What we claim is:

1. In a rotary hay baler including a frame and a plurality of opposed groups of cooperating endless baling belts mounted in said frame, said groups of belts defining spaced side portions of a generally cylindrical baling chamber which increases in size to a predetermined maximum diameter as bales are formed therein, the belts of one of said groups of belts being disposed in laterally spaced relation with respect to each other, a shaft carried by said frame and rotatable about an axis in spaced parallel relationship to the axis of the chamber defined by said belts, a plurality of intucking disklike rotors mounted fast on said shaft for rotation therewith, said rotors being disposed in axially spaced relationship on said shaft and each disposed in a plane intermediate adjacent belts of one of said groups of belts, a peripheral portion of each of said rotors extending radially into said chamber between said adjacent belts when said chamber approaches its maximum diameter whereby to continuously intuck the fibrous material comprising said bale to bind the bale together, and a plurality of circumferentially spaced material engaging supplementary intucking elements comprising elongated generally radially extended ribs projecting axially outwardly from opposite sides of each of said rotors adjacent the periphery thereof.

2. In an attachment for rotary balers including a frame, and opposed groups of belts capable of defining a generally cylindrical chamber which increases in size to a predetermined maximum diameter as bales are formed therein, the belts of one of said groups being disposed in laterally spaced relation with respect to each other, said attachment comprising a mounting bar adapted to be rigidly secured to the said frame in radially outwardly spaced generally parallel relation to the chamber, a pair of frame members disposed adjacent each end of said mounting bar and extending parallel to each other in a substantially lateral direction lying in planes normal to said bar, bracket means pivotally secured to said frame members at their outer ends for swinging movements about a common axis parallel to the axis of said chamber, a shaft mounted at its opposite ends in said bracket means on an axis parallel to the axis of said chamber, a plurality of disklike intucking rotors mounted on said shaft, said intucking rotors being disposed in axially spaced relationship with respect to said chamber and adapted to extend between adjacent belts of one group thereof, said rotors and rotor shaft being movable with the said bracket means about the axis of swinging movement thereof between an operative position wherein the peripheral portions of said intucking rotors extend radially into said chamber when the chamber approaches its maximum diameter and an inoperative position in radially outwardly spaced relation to said operative position, and means for releasably locking said bracket means in said operative position.

3. The structure defined in claim 2 in which said mounting bar is provided with a plurality of guide bars extending laterally outwardly from said mounting bar in spaced relation longitudinally thereof, the belts of said one of the groups thereof each being disposed between an adjacent pair of guide bars, whereby to be guided in said spaced relationship thereby.

4. In a rotary hay baler a frame structure including a pair of generally upright laterally spaced legs and a transverse tie rod, groups of opposed endless belts capable of defining a generally cylindrical chamber between said legs which increases in size to a predetermined maximum diameter as bales are formed therein, spaced pulley means in said frame for carrying one of said groups of belts and dividing the belts of said one of the groups into converging delivery and return flights and a chamber defining flight, the belts of said one of the groups thereof being disposed in spaced relation laterally with respect to each other, a mounting bar rigidly secured at its opposite ends to said legs in radially outwardly spaced generally parallel relation to a chamber defined by said belts, a pair of frame members disposed adjacent each end of said mounting bar and extending parallel to each other in a substantially lateral direction lying in planes normal to said bar, bracket means pivotally secured to said frame members at their outer ends for swinging movements about a common axis parallel to the axis of the chamber defined by said belts, a shaft mounted at its opposite ends in said bracket means on an axis parallel to said mounting bar, a plurality of disklike intucking rotors mounted on said shaft, said intucking rotors being disposed in axially spaced relationship with respect to said chamber and adapted to extend between adjacent belts of said one of the groups thereof, said rotors and rotor shaft being movable with the said bracket means about the axis of swinging movement thereof between an operative position wherein the peripheral portions of said intucking rotors extend radially into said chamber when the chamber approaches its maximum diameter and an inoperative position in outwardly spaced relation to said operative position, means for releasably locking said bracket means in said operative position, a plurality of guide bars each anchored at one end to said mounting bar and extending transversely outwardly therefrom in longitudinally spaced relationship with respect thereto, the belts of one of said converging flights thereof each being movable between adjacent ones of said guide bars and maintained in spaced relation thereby, a second plurality of guide bars extending transversely outwardly from said mounting bar in a direction generally opposite that of said first-mentioned guide bars, said second guide bars projecting outwardly between adjacent ones of said belts in the other converging flight thereof, and means for connecting the outer ends of said second guide bars to said transverse tie rod.

5. In a rotary hay baler including a frame and a plurality of opposed groups of cooperating endless baling belts mounted in said frame, said groups of belts defining spaced side portions of a generally cylindrical baling chamber which increases in size to a predetermined maximum diameter as bales are formed therein, the belts of one of said groups of belts being disposed in laterally spaced relation with respect to each other, a shaft carried by said frame and rotatable about an axis in spaced parallel relationship to the axis of the chamber defined by said belts, a plurality of intucking disklike rotors mounted fast on said shaft for rotation therewith, said rotors being disposed in axially spaced relationship on said shaft and each disposed in a plane intermediate adjacent belts of one of said groups of belts, a peripheral portion of each of said rotors extending radially into said chamber between said adjacent belts when said chamber approaches its maximum diameter whereby to continuously intuck the fibrous material comprising said bale to bind the bale together, and a plurality of circumferentially spaced elongated supplementary intucking ribs projecting axially outwardly from opposite sides of each of said rotors, said ribs curving generally radially outwardly and forwardly in the direction of rotation of said rotors whereby to cause a minimum of frictional engagement with a bale being formed within the chamber upon entering said bale, said ribs terminating adjacent the periphery of said rotors.

References Cited in the file of this patent

UNITED STATES PATENTS

| | | |
|---|---|---|
| 750,672 | Luebben | Jan. 26, 1904 |
| 1,027,393 | Brown | May 21, 1912 |
| 1,486,360 | Brown | Mar. 11, 1924 |
| 2,096,990 | Luebben | Oct. 26, 1937 |